United States Patent
Hodkinson

(10) Patent No.: US 7,623,309 B2
(45) Date of Patent: Nov. 24, 2009

(54) APPARATUS AND METHOD FOR USE IN TRANSFERRING INFORMATION RELATIVE TO A STORAGE MEDIUM

(75) Inventor: Allan Hodkinson, Bedminster (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 10/833,271

(22) Filed: Apr. 28, 2004

(65) Prior Publication Data

US 2005/0041315 A1    Feb. 24, 2005

(30) Foreign Application Priority Data

Apr. 28, 2003    (GB) ................................. 0309551.0

(51) Int. Cl.
*G11B 5/02* (2006.01)
(52) U.S. Cl. ....................................... 360/25
(58) Field of Classification Search ................ 360/25
See application file for complete search history.

(56) References Cited

U.S. PATENT DOCUMENTS

| | | | |
|---|---|---|---|
| 4,295,168 A * | 10/1981 | Muller ......................... 360/66 |
| 6,101,053 A * | 8/2000 | Takahashi ..................... 360/46 |
| 6,147,828 A | 11/2000 | Bloodworth et al. | |
| 6,181,494 B1 * | 1/2001 | Fujiwara ...................... 360/46 |
| 6,498,693 B1 * | 12/2002 | Au et al. ....................... 360/31 |
| 6,519,715 B1 * | 2/2003 | Takashi et al. ................ 714/32 |
| 6,597,650 B2 * | 7/2003 | Katakura et al. ......... 369/59.22 |
| 6,995,933 B1 * | 2/2006 | Codilian et al. ............... 360/46 |

FOREIGN PATENT DOCUMENTS

GB    2267838    12/1993

* cited by examiner

*Primary Examiner*—Daniell L Negrón

(57) ABSTRACT

Plural information transfer elements transfer signals from plural magnetic tape tracks of plural tapes. Each element and track has a different non-linear transfer function. A processor (1) determines appropriate compensation for the signal one of the transfer elements derives, (2) accesses stored information for compensation characteristics of each of the data transfer elements, and (3) references the accessed information with the compensation determined for the one element to establish an appropriate compensation for the other elements.

20 Claims, 5 Drawing Sheets

APPARATUS AND METHOD FOR USE IN TRANSFERRING INFORMATION RELATIVE TO A STORAGE MEDIUM

FIELD OF INVENTION

This invention relates to an apparatus and method for use in transferring information relative to a storage medium. It also relates to data transfer devices, which include a data transfer head.

BACKGROUND ART

Information transfer devices read and/or write information from/to a storage medium. The transfer devices include tape drive devices in which the medium comprises a length of tape wound on at least one reel, which is drawn past a data transfer head. The data transfer head includes at least one data transfer element, i.e., transducer, which in use transfers information onto the medium or reads information from the medium. In some instances, a single data transfer head performs both read and write functions. With a magnetic tape drive, information is stored magnetically by applying a write current to the element (i.e. electric-magnetic transducer) as tape is drawn past the element. Information is read by from the tape by measuring an output current from the element as the tape is drawn past the head. A disk drive is similar in principle except that a rotating disk carrying the recorded information rotates past the information transfer head, i.e., transducer.

When reading information from a storage medium a data transfer element produces a signal that depends on the information stored on the medium being read. The element typically produces an analogue output signal which is passed through an amplifier to a read channel circuit which processes the analogue signal. In many devices the read head comprises multiple data transfer elements that read information from multiple tracks of a storage medium at the same time. In the case of a magneto-resistive (MR) data transfer head, each data transfer element can be represented by the electrical equivalent circuit shown in FIG. 1 of the accompanying drawings as a simple resistive element which is designated by the reference numeral 10. When a magnetic field, or flux, is applied to the head element the resistance of the element 10 varies. If a constant bias current $I_{BC}$ is caused to flow through the resistive element a voltage $V_{out}$ is produced across the resistive element 10 which can be amplified.

Specifically, as shown in FIG. 2 of the accompanying drawings, the magnitude of the voltage across the resistive element 10 is related by a non-linear transfer function 24 to the sinusoidal flux 21 applied to the element. In FIG. 2 the horizontal axis 23 represents the flux applied to the element 10 and the vertical axis 22 represents the output voltage $V_{out}$. The Figure shows that the output voltage waveform 24 varies between $V_{max}$ and $V_{min}$ as the flux varies between $X_{max}$ and $X_{min}$. This allows data to be encoded on a magnetic medium (tape or disk or the like) by changing the flux of the medium to be read by the data transfer element. Because several data transfer elements are provided, each producing its own output voltage, several tracks of data can be provided in parallel on the tape or disk which can be read simultaneously, increasing the rate of data transfer for a given tape or disk speed.

Magneto Resistive (MR) information transfer elements suffer from a non-linear distortion in their output voltage/flux characteristic 20. This is because the transfer function of MR data transfer elements is non-linear and depends, inter alia, upon the intrinsic properties of the element and on the properties of the medium. One such property that affects the linearity is the coercivity of the magnetic recording medium. This distortion is often referred to as amplitude asymmetry.

The transfer function 20 shown in FIG. 2 is clearly non-linear and, despite using a bias current that places the output voltage in the most linear region of the transfer function, the output voltage waveform 24 responsive to the sinusoidal flux variation 21 is a distorted sinusoid. This non-linearity introduces amplitude asymmetry to the transfer signal produced by the element (i.e. the positive and negative cycles are not the same). For an information transfer head having multiple elements, the distortion—and hence the amplitude asymmetry—for each element is independent as each element has slightly different properties. This can significantly degrade the performance of the data transfer device.

It can be shown that the transfer function 20 of an MR element can be approximated by the relationship:

$$V_{out}=V_{in}+V_{in}^2*K \quad (1)$$

where $V_{out}$ is the output voltage measured across the element and $V_{in}$ is the input signal representing the magnetic flux and K is an example of a compensation value which is usually <0 and a constant for a given combination of magneto-resistive element and coercivity of storage medium.

If the compensation value, K, is chosen appropriately it is possible to reduce the effects of the asymmetry for a given coercivity of storage medium. The appropriate compensation value can be chosen by selecting an initial compensation value and observing the asymmetry exhibited by the element when used to read information from the storage medium. If the output is not symmetrical the compensation value is inappropriate and should be increased or decreased slightly and the test repeated. The test can be continued many times until the most appropriate compensation value is found, i.e. the one that minimises the asymmetry of the output from the element at the given coercivity or brings it within acceptable limits.

For a multi-transfer element head an appropriate value of K must be chosen for each data transfer element since each data transfer element has a different characteristic. The result of the tests is a data transfer head that exhibits little asymmetry for the given coercivity. The tests should be repeated if the coercivity of the medium changes so that a new set of appropriate values of K can be obtained.

Another solution to the amplitude asymmetry problem is the use of a non-linear analogue to digital converter which converts the output voltage from the head element to a digital signal. The non-linearity of the converter is chosen to be the reciprocal of the non-linearity of the data transfer element so the effects of non-linearity can be removed. As with the use of calibration values K, this works well with a data transfer device having a fixed storage medium with a given coercivity, but it is of limited use with a device that uses a removable storage medium. Whenever a new storage medium is presented to the device, which may have a different coercivity, the distortion will also change, as the non-linearity of the amplifier may no longer be appropriate.

SUMMARY OF INVENTION

According to a first aspect the invention provides apparatus for transferring data from a storage medium comprising:

at least two data transfer elements, each for producing a respective data transfer signal having a respective distortion characteristic dependent upon a property of the storage medium;

a transfer signal processing apparatus for determining an appropriate compensation value to apply to the data transfer signal for one of the data transfer elements so as to at least partially compensate for effects on the signal caused by the distortion characteristic of the one element, an information access apparatus arranged to access stored compensation information which relates to the distortion characteristics of each of the data transfer elements over a range of storage medium for which said physical property is different, and a reference apparatus arranged to reference the accessed information using the determined compensation value for the one element to establish an appropriate compensation value for the other data transfer element.

The data transfer elements may comprise magneto-resistive elements and the property of the storage medium may comprise the coercivity of the medium. In this case, the apparatus will provide compensation values for each element which at least partially remove the effects of asymmetry in the signals from the elements that arise due, inter alia, to the coercivity of the medium and the characteristics of the elements.

The data transfer apparatus may additionally include a compensation information determining apparatus arranged to determine the compensation information for each of the data transfer elements by monitoring the signal for each head element when transferring information from a range of magnetic storage medium having different coercivities.

This is not, in all embodiments, essential. The compensation information could be generated remotely, perhaps using apparatus provided on a test bench at a manufacturing or testing facility with the elements being tested they are fitted to the apparatus.

The stored compensation information may be held in many forms. For example, it may comprise a respective set of asymmetry values for each of the data transfer elements, each value in the set perhaps corresponding to the compensation required for of a storage medium having a different value for the property of the storage medium.

The compensation information may comprise a respective data set of correction values for each data transfer element with each value being dependent upon the coercivity of the storage medium.

Each of these compensation values may be the value K in the following relationship:

$$V_{out} = V_{in} + V_{in}^2 * K \quad (1)$$

The compensation information may comprise a set of scaling values, each value indicating how much the distortion characteristic of the signal from a data transfer element has changed for a given medium relative to a reference medium.

In a still further alternative, the compensation information may comprise a respective mathematical expression associated with each data transfer element. Therefore, instead of storing a set of values to form the stored information the method may instead include a step of fitting the asymmetry values determined for a range of medium of differing coercivities to a mathematical equation which applies across the range of coercivity values, a separate equation being derived for each head element. The equation may give an absolute asymmetry value or may indicate a change in asymmetry value relative to that for the head with a reference medium of known coercivity. It may, for example, be a linear equation. At least one of these equations may be stored in the memory, and preferably all of the equations.

In another arrangement, the stored information may be held as data in a look up table, which comprises a two dimensional table with each row (or column) corresponding to one of the head elements and each column (or row) corresponding to a known coercivity of a storage medium.

In the case of a look-up table, the asymmetry determined for the data transfer elements can be found in the table, and the corresponding asymmetry values for all of the remaining data transfer elements stored in the table can then easily be read out.

The data transfer apparatus may include a memory, such as a random access memory or read only memory in which the compensation information is stored. An additional memory may be provided in which the compensation values may be stored.

The data transfer apparatus may comprise a tape drive wherein the medium comprises a magnetic tape which is removable from the device. In an alternative, the device may comprise a disk drive wherein the medium comprises a magnetic disk.

There may of course be more than two data transfer elements which may form a part of a single head assembly. The memory may store information for each of the head elements of the assembly. It may comprise a non-volatile memory.

It will be appreciated that a processor may be provided which, when executing appropriate program instructions, provides the functionality of the transfer function processing apparatus, information access apparatus and determining apparatus. The processor may have an input which receives the transfer signals and an output to which the compensation values are passed. A connection between the processor and a memory in which the program instructions and the compensation information is stored may also be provided. The processor and memory could be integrated into a single semiconductor package for example.

Otherwise, the apparatus could be provided by a bespoke integrated circuit using discrete components supported on one or more circuit boards.

According to a second aspect the invention provides a method for use in transferring data from a storage medium, the method comprising:

receiving a data transfer signal from at least two data transfer elements;

determining an appropriate compensation value to apply to the data transfer signal for one of said data transfer elements which at least partially compensates for a distortion in the signal dependent upon a property of the medium, accessing stored compensation information which relates to the compensation characteristics of each of the data transfer elements over a range of storage medium with different properties, and referencing the accessed information using the compensation value determined for said one element to establish an appropriate respective compensation value for each of the other elements which at least partially compensates for a distortion in the respective signals produced by the other elements.

The method may further include the steps of determining the distortion in the signal from each data transfer element for a range of magnetic storage medium having different properties, determining a compensation value for each element at each respective output condition which reduces the distortion in the signal from each element at each respective output condition, and generating the stored calibration from the determined compensation values.

In at least one arrangement the method may be especially suitable for use with magneto-resistive data transfer elements in which the property of the medium which contributes to the distortion is the coercivity of the storage medium. The range of medium may span a range of coercivities from relatively low to relatively high coercivity.

The steps of determining the distortion and building up the stored compensation—an initial "calibration stage"— may be performed whenever the device is first used, or in the factory which produces the devices prior to shipping the device for sale.

The steps of the subsequent determining which compensation values to use for each element—a "compensation stage", on the other hand, may be carried out at regular intervals, or whenever the device is switched on, or whenever a change in medium occurs. For a tape drive device, this may occur whenever the tape is changed. It may recalibrate automatically whenever such an event occurs or whenever requested by a user.

According to a third aspect the invention provides a method of calibrating a data transfer device having at least two data transfer elements for subsequent use with a storage medium having an associated property comprising:

determining a distortion in a respective transfer signal from each data transfer element reading information from a range of storage medium having different properties and for each data transfer element storing calibration information in a memory which is dependent upon the determined distortion in the respective signals across the range of medium.

The range of properties of the medium may comprise a range of coercivities.

The method may further include determining a compensation value for each data transfer element at each respective output condition which reduces the distortion in the respective signal from each element at each respective output condition.

According to a fourth aspect the invention provides a computer program comprising a set of instructions provided on a data carrier which when running on a processor cause the processor to:

receive a data transfer signal from at least two data transfer elements;

determine an appropriate compensation value to apply to the data transfer signal for one of the data transfer elements which at least partially compensates for a distortion in the signal, access stored compensation information which relates to the compensation characteristics of each of the data transfer elements over a range of storage medium properties, and reference the accessed information with the compensation value determined for the one element to establish an appropriate compensation value for each of the other elements which at least partially compensates for a distortion in their respective signals.

The computer program may be provided on any one of a number of known types of data carrier although it is envisaged that it will most preferably comprise an EPROM.

According to a fifth aspect the invention provides a data carrier which carries program instructions which when running on a processor cause the processor to provide the method of any one of the second or third aspects of the invention.

According to a sixth aspect the invention provides a circuit for use in combination with at least two data transfer elements which includes a portion of memory storing information which together with a value for a distortion characteristic exhibited by one of the data transfer elements permits an estimate of the distortion characteristic of the other head elements to be made.

By providing the information in a memory it is possible to test only one data transfer element to determine its asymmetry and from the results of this test estimate the asymmetry of the remaining elements. Where the circuit is included with a read head of a tape drive, for example, upon inserting a new tape to the drive all the elements can be recalibrated from the testing of only one read head element. It is envisaged that this will reduce calibration time considerably in the field.

According to a seventh aspect the invention provides a magnetic tape drive comprising:

a data transfer head comprising at least two magneto-resistive data transfer elements, each producing an output signal when in the presence of a magnetic flux from a magnetic storage medium having an associated coercivity;

a transfer signal processing apparatus for determining an appropriate compensation value to apply to the data transfer signal for one of the data transfer elements which at least partially compensates for a distortion in the signal dependent upon the coercivity of the storage medium, a memory which stores compensation information which relates to the distortion characteristics of each of the data transfer elements over a range of storage medium coercivities;

an access device for accessing the stored compensation information, and referencing means for referencing the accessed information with the compensation value determined for said one element to establish an appropriate compensation value for the other elements.

According to an eighth aspect the invention provides a method of calibrating a magnetic tape drive device having at least two magneto-resistive data transfer elements for use with magnetic storage medium having a range of associated coercivities; the method comprising the steps of:

in an initial calibration stage:
  determining the asymmetry of each element for a range of magnetic storage medium having different coercivities,
  for each element storing calibration information dependent upon the determined asymmetry in a memory; and
in a subsequent compensation stage:
  measuring the asymmetry of one of the data transfer elements when reading information from a magnetic storage medium having an associated coercivity, and
  determining the asymmetry of the remaining data transfer elements using the calibration information stored in the memory together with the asymmetry value determined for the one head element.

According to a ninth aspect the invention provides apparatus for transferring data from a storage medium having an associated output condition comprising:

at least two data transfer elements, each producing a respective data transfer signal having a distortion characteristic dependent upon the output of the storage medium;

transfer signal processing means for determining an appropriate compensation value to apply to the data transfer signal of one of the data transfer elements which at least partially compensates for the distortion in the signal, access means for accessing stored compensation information which relates to the compensation characteristics of each of the data transfer elements over a range of storage medium output conditions, and referencing means for referencing the accessed information with the compensation value determined for the one element to establish a respective appropriate compensation value for each of the other elements.

It will be appreciated that one or more processors, typically microprocessors, may be provided which, when executing appropriate program instructions, provides the functionality of the various means of the apparatus. A processor may be provided which has an input which receives the transfer signals and an output at which the compensation values are passed. A connection between the processor and a memory in which the program instructions and the compensation information is stored may also be provided. The processor and memory could be integrated into a single semi-conductor package for example.

Otherwise, one or more of the various means could be provided by a bespoke integrated circuit using discrete components supported on one or more circuit boards.

According to a tenth aspect the invention provides a method of reducing the effects of distortion on signals from a plurality of data transfer elements of a data transfer apparatus comprising:

determining a compensation value required to at least partially compensate for a distortion characteristic of a signal obtained from at least one of the data transfer elements; and using the determined compensation value for that element to reference stored compensation information relating to the distortion characteristics of the other elements to determine a respective appropriate compensation value to apply to said other elements.

According to an eleventh aspect the invention provides an apparatus for use in reducing the effects of distortion on signals from a plurality of data transfer elements of a data transfer apparatus comprising:

compensation value determining apparatus arranged to determine a compensation value required to at least partially compensate for a distortion characteristic of a signal obtained from at least one of the data transfer elements; and a reference apparatus arranged to use the determined compensation value for that element to reference stored compensation information relating to the distortion characteristics of the other elements to determine a respective appropriate compensation value to apply to said other elements.

A further aspect of the invention relates to apparatus for reading magnetic undulations from N tracks of plural magnetic media, where N is an integer greater than one. Each medium of the media has a tendency to have different magnetic properties. The apparatus comprises N electric magnetic transducers. Each of the transducers transduces magnetic undulations of one of the tracks. The N transducers tend to have different transducing properties relative to the magnetic medium. A memory stores indications of the different transducer properties. A processor arrangement (a) monitors a signal derived by transducer k in response to initial reading by transducer k of the magnetic undulations of track k of the magnetic medium (where k is one of N), and (b) modifies the stored indications of the different transducer properties for each of the transducers in response to the monitored signal.

An additional aspect of the invention concerns a method of reading magnetic undulations from N tracks of plural magnetic media where N is an integer greater than one. The plural media have a tendency to have different magnetic properties. The method is performed with N electric-magnetic transducers each of which transduces magnetic undulations of one of the tracks. The transducers tend to have different transducing properties relative to the magnetic medium. The method comprises, for a first magnetic medium of the media: (a) monitoring a signal derived by transducer k in response to initial reading by transducer k of the magnetic undulations of track k of the first magnetic medium, where k is one of N, (b) modifying stored indications of the different transducer properties for each of the transducers in response to the monitored signal, and (c) reading the magnetic undulations of the N tracks with the N transducers. Steps (a), (b) and (c) are repeated for a second magnetic medium of the media.

Preferably the modifying is performed for each of the transducers as the transducers transduce the magnetic undulations. More particularly, the modifying step is performed for each of the transducers as the transducers read the magnetic undulations.

BRIEF DESCRIPTION OF DRAWING

There will now be described, by way of example only, one embodiment of the present invention as illustrated in the accompanying drawings of which.

DETAILED DESCRIPTION OF DRAWING

Figure 3:
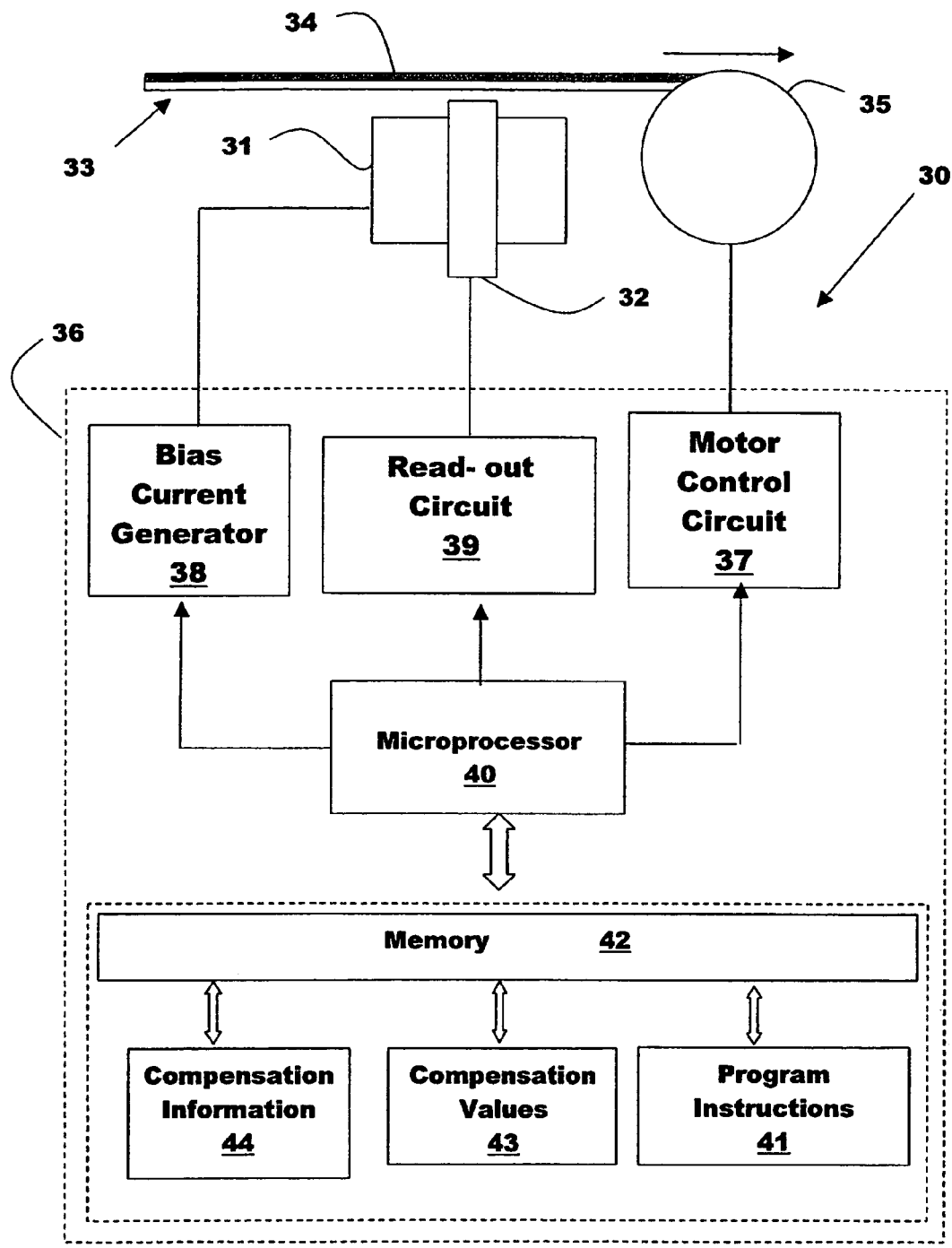
FIG. 3 is a block diagram of a part of an embodiment of magnetic storage device in accordance with an aspect of the invention.

FIG. 3 is a block diagram of an apparatus for data transfer. In this example the device comprises a magnetic tape drive 30 which includes a read head assembly 31 having a plurality of magneto-resistive (MR) data transfer elements (i.e. electric-magnetic transducers) 32. Each data transfer element 32 produces an output voltage when exposed to a changing flux provided by drawing a magnetic storage medium 33 past the head assembly 31. In this example, the medium 33 comprises a length of tape coated with magnetic particles 34 which can be drawn across the head assembly 31 by a spool 35 which is rotated by a motor (not shown). A property of the medium is the coercivity of the tape which can vary from tape to tape over a range of values. The storage medium carries 8 data tracks (not shown) which encode digital data as regions of positive or negative flux. Of course, analogue information could be stored on the tracks instead.

The tape drive also includes a printed circuit board 36 which supports components defining a motor control circuit 37 which drives the motor connected to the spool 35, and a bias current generator 38 which applies a constant bias current to each of the data transfer elements 32. It also includes a read out circuit 39 which produces transfer signals from the data transfer elements as the tape is pulled across the head by the spool 35. The bias current generator 38, the read out circuit 38 and the motor control circuit 37 which controls the motor are all operated under the command of a microprocessor 40 which runs program instructions 41 stored in an area of memory 42. The memory 42 in this example may be in at least two parts-one being a relatively permanent, or non-volatile, memory such as an EPROM and the other portion a random access memory. Program instructions and compensation information can be stored in an appropriate part of the memory 42. This will all be readily apparent to the man skilled in the art of production of devices of this type.

Figure 1:
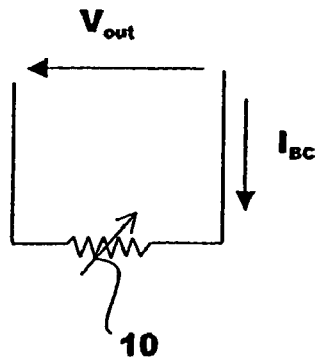
FIG. 1, as described, is a schematic representation of an electrical equivalent circuit for a magneto-resistive read head element.

Each MR data transfer element 32 can be represented by the electrical equivalent circuit shown in FIG. 1 of the accompanying drawings as a simple resistive element which is designated by the reference numeral 10. When a magnetic field, or flux, is applied to the head element the resistance of the element 10 varies.

Figure 2:
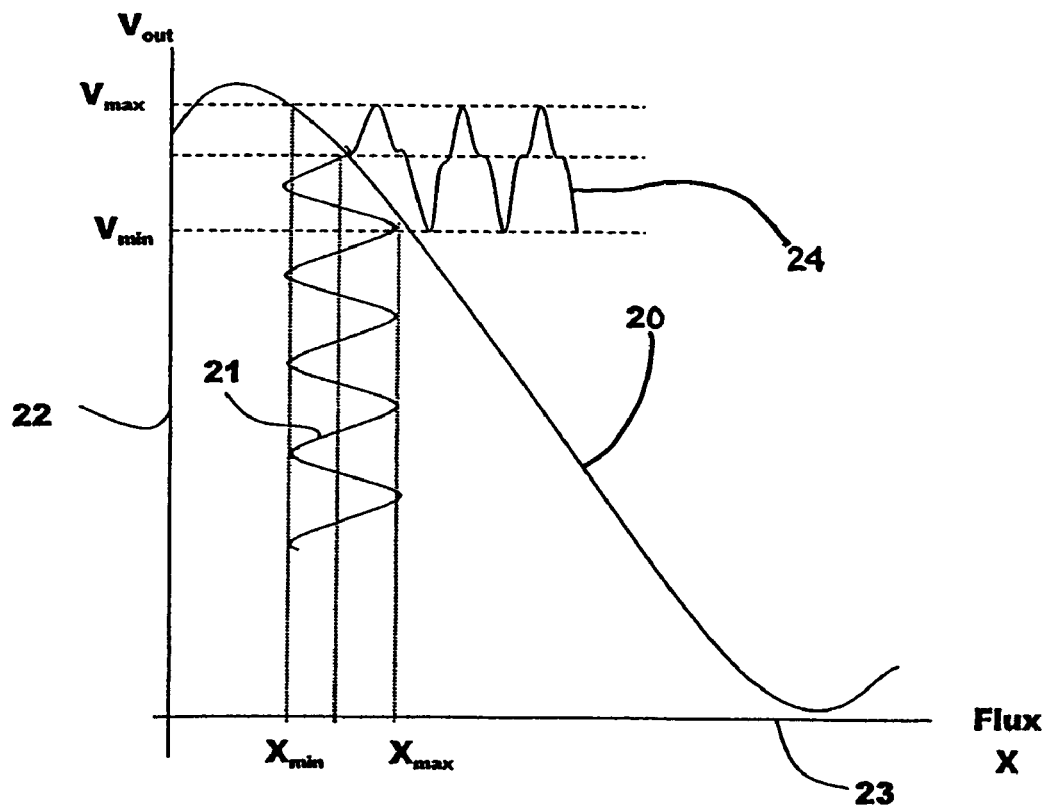
FIG. 2, as described, is a plot of output voltage against flux for a typical magneto-resistive head element.

FIG. 2 illustrates a typical output voltage waveform 20 obtained from one of the data transfer elements 10 when a region of magnetic tape carrying information—stored as alternating regions of positive flux followed by negative flux followed by positive flux—passes across the head. The output voltage 20 is non-sinusoidal and varies between a maximum and minimum voltage value as the flux 21 varies sinusoidally.

Although not shown in detail, a suitable read-out circuit 39 may comprise a mixture of analogue and digital circuitry, whilst identical circuits may be used for each of the remaining read heads or the output voltages may be multiplexed to allow a single circuit to be used for all output voltages.

Figure 7:
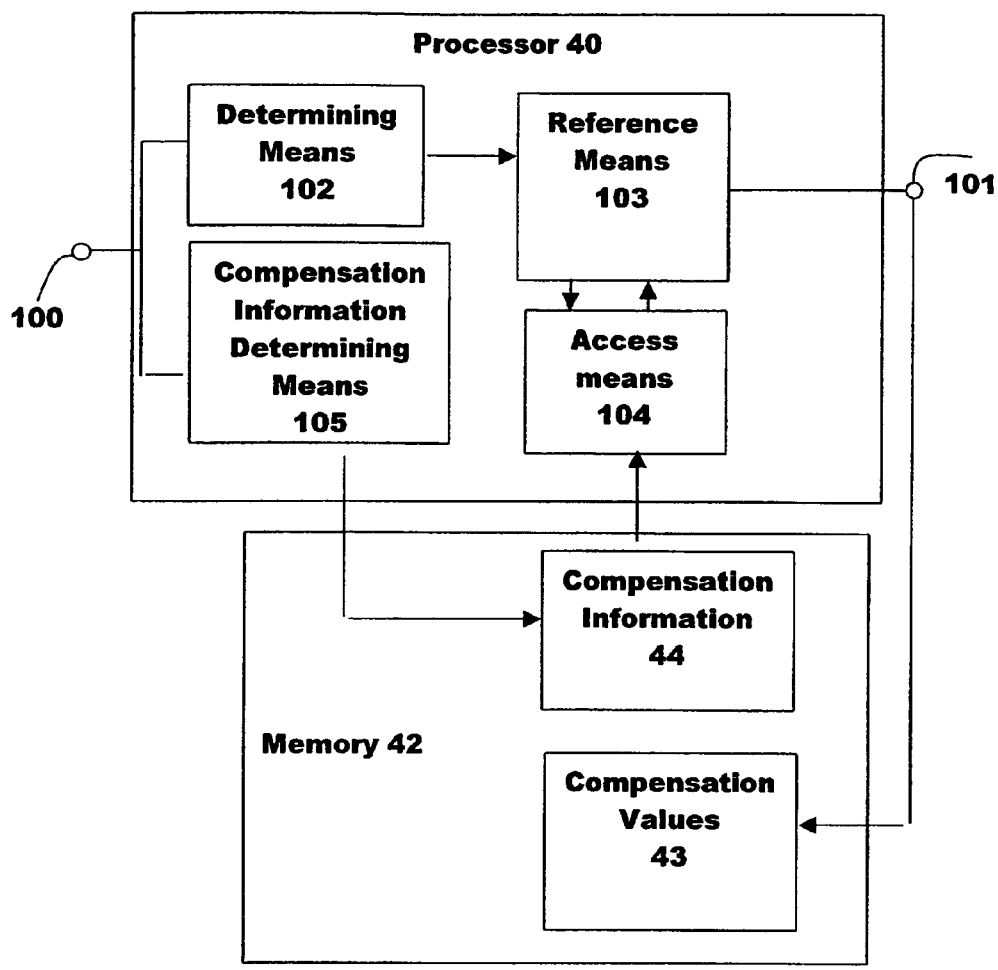
FIG. 7 is a diagram illustrating the relationship between the contents of the memory and the processor of the apparatus.

As best seen in FIG. 7, the microprocessor 40 has at least one input terminal 100 which is connected to the read-out circuit 39 and an output terminal 101. The microprocessor 40 receives at its input terminal 100 the transfer signals. The program instructions 41 stored in the memory 42 when running on the processor 40 cause the processor 40 to determine an amount of compensation to apply to these signals which are then passed to its output terminal. The purpose of the compensation is to remove, or at least reduce, the effect of distortions that are caused, inter alia, by the characteristics of the data transfer element and the coercivity of the tape, based on the relationship (1):

$$V_{out} = V_{in} + V_{in}^2 * K \quad (1)$$

Where $V_{out}$ is the output voltage across the data transfer element received by the read-out circuit and $V_{in}$ is the input signal representing the magnetic flux and K is a compensation value usually <0 and a constant.

The value of K is a compensation value which when applied to the read-out circuit at least partially compensates for the effects of distortion. The appropriate value is unique for each data transfer element. In this case 8 values of K are needed. These compensation values 43 are stored in the memory and are initially obtained from a larger set of stored compensation information 42 which is also held in the memory 40.

Being more specific, in this example the program instructions cause the microprocessor to provide a transfer signal processing means 102 which determines an appropriate compensation value to be applied to one of the data transfer elements by measuring the distortion in the transfer signal produced by that element. The processor also provides reference means 103 which references the stored information with the compensation value that has been selected for the first data transfer element to determine the compensation values for the remaining elements. An access means 104 permits the processor to access the compensation information that is held in the memory and pass it to the reference means 103. The complete set of compensation values for all the elements are provided at the output terminal of the processor by the reference means 103 and are written to the memory.

The processor therefore selects appropriate values of K by referencing the stored information which means that only a single data transfer element has to be tested whenever a new medium is used. This provides a significant advantage over the prior art in which no stored compensation information is provided, and where all 8 data transfer elements would need to have been tested whenever the device is to be calibrated or compensated to new storage medium.

In this example the stored compensation information 44 comprises a set of data held in the form look-up table of many possible K values. The values of K are written to the memory by a compensation information determining means 105. This is again provided by the microprocessor executing a portion of the program instructions during an initial calibration of the device. The values of K held in an area of the memory 42 for use by amplifiers are taken from the look-up table during a subsequent calibration stage.

Figure 4:
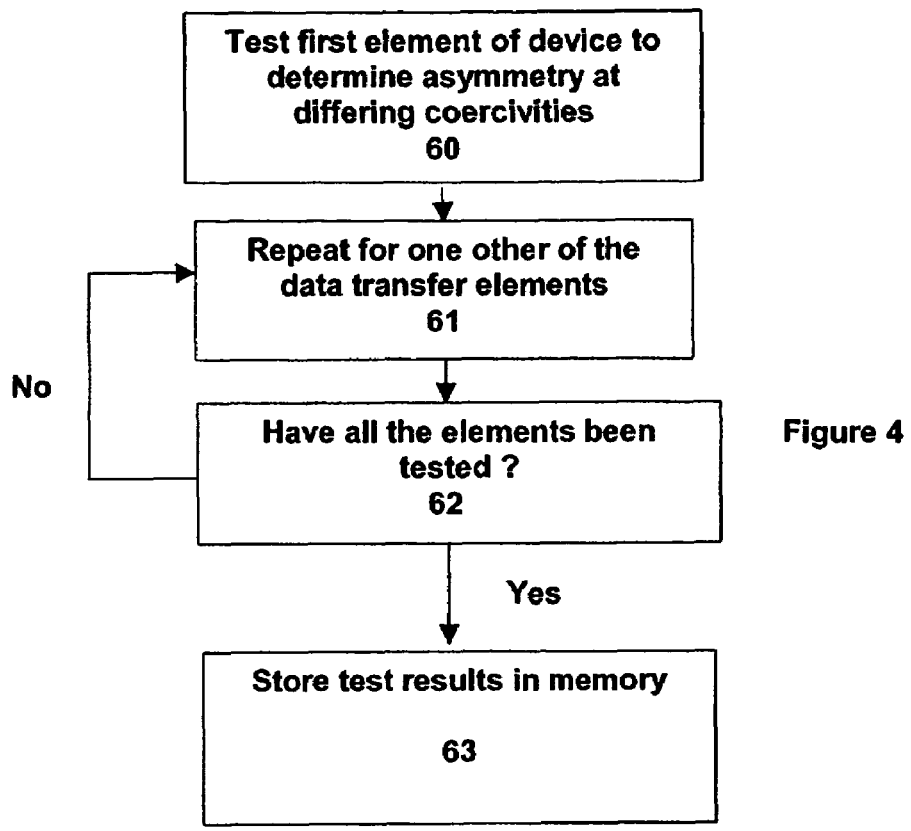
FIG. 4 is a flow diagram of the steps carried out to initially test the device of FIG. 3 or any similar device which includes a plurality of MR heads.
Figure 6:
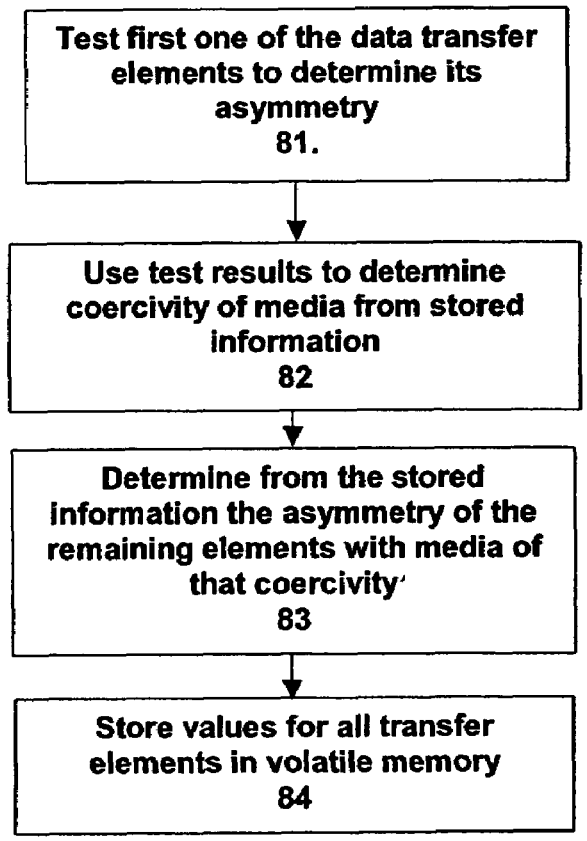
FIG. 6 is a flow chart of the steps performed in subsequent calibration of the head elements of the storage device.

The method by which the compensation information is obtained for storage in the memory, and how it can then be used to calibrate all the data transfer elements of the device whilst only testing one element can best be understood with reference to FIGS. 4 and 6 of the accompanying drawings.

To initially obtain the values of K stored in the look up table, each data transfer element 32 of the device is first tested 60 using a set of reference storage medium of known, but differing, coercivities by the compensation information determining means 105. Such a test is well known in the art for calibration of a single element of, say, a tape drive or hard disk drive, although it is not known to perform the test with different reference medium nor to store the results on the device as information which can later be used during a re-calibration of the device. The test is then repeated for a further one of the elements 61 and repeated 62 until all have been tested. At the end of this stage all the results of the tests (asymmetry at the differing coercivities for all the elements) are stored 63 in memory as a look-up table.

Figure 5:
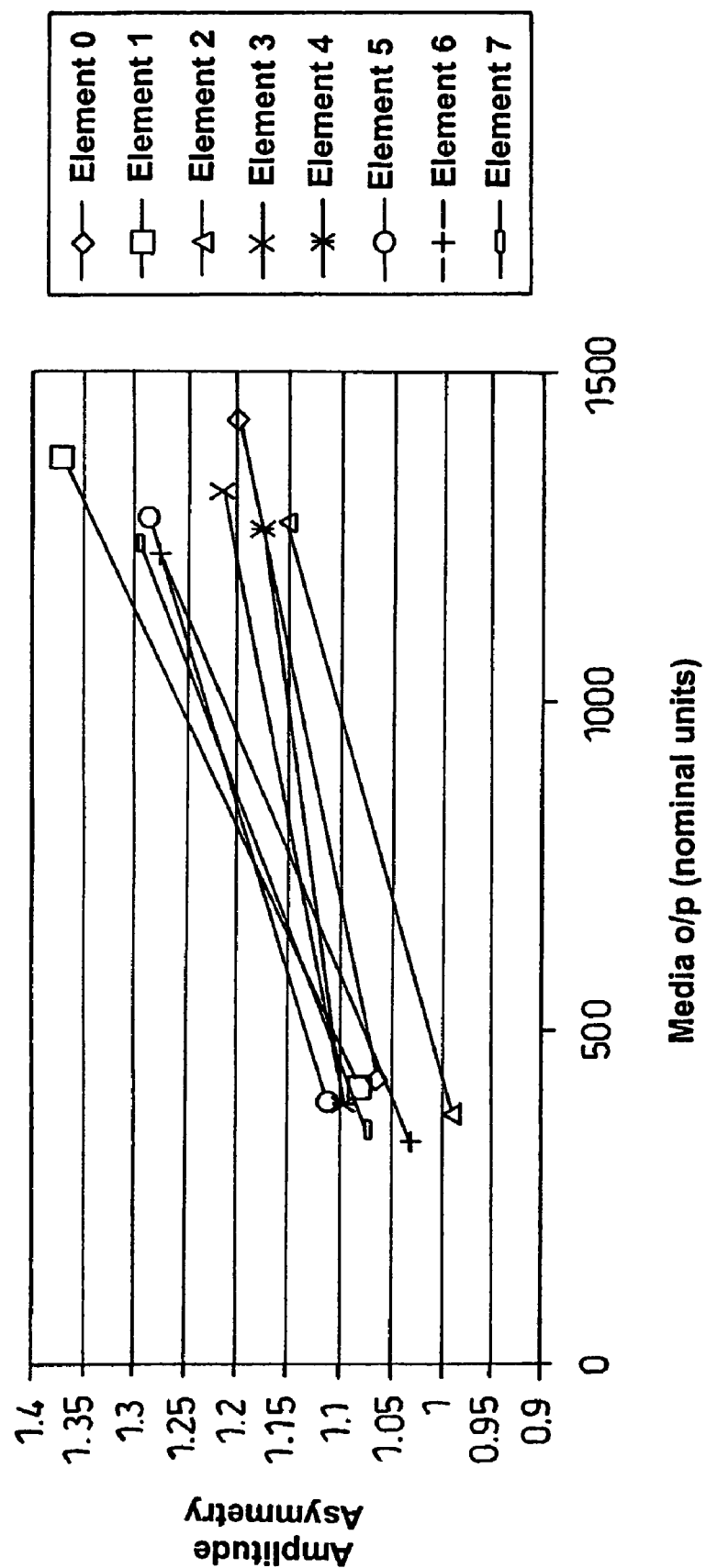
FIG. 5 is a set of plots showing the change in asymmetry with coercivity for a set of sample medium obtained during the initial testing stage of the method of FIG. 4.

At the end of the testing stage, the look-up table will contain 8 columns of compensation values sorted into 8 rows, each row corresponding to one of the heads. The values are obtained from a plot of asymmetry against coercivity of the medium samples. A typical set of plots from the eight elements is shown in FIG. 5 of the accompanying drawings. Each line represents the change in asymmetry with coercivity of the medium for an individual element.

Whenever the medium is changed, and hence its coercivity property may have changed, or upon the first use of the device, the medium is calibrated to determine a new set of appropriate compensation values required for each element and the new values are placed in the area of volatile memory.

The method by which the values of K are subsequently determined during this calibration stage is as follows. Referring to FIG. 6, in a first calibration step 81 only one of the eight data transfer elements is tested with the medium and the asymmetry exhibited by this first one of the elements is determined. In a second step, the row in the look-up table which corresponds to the first element is checked 82 to locate the column which contains the measured value of K for the first head. In a third step 83, the method comprises reading out the remaining values of K by reading down that column for all elements. Finally, the K values are stored 84 in the memory.

It will of course be appreciated that the value of K determined for the first element may lie midway between the values of K stored in the adjacent columns of the look-up table. In this case, the values in the adjacent columns of the look-up table are interpolated in order to determine which value to use for each head.

All the new values of K remain stored in an area of memory within the device for subsequent use until such time as it is necessary to recalculate the values upon a further change of medium.

It will be appreciated that it is not essential to use a look-up table and a modified device is envisaged in which the table is replaced by 8 equations stored in the non-volatile memory. Each equation defines the change in asymmetry with coercivity of the medium, and can be obtained by finding the best fit curve for the plots of FIG. 6. By testing only one head the change in asymmetry for that head can be determined. This can be fitted to the equation for that head to determine the coercivity of the medium. Finally this coercivity can be plugged into the remaining 7 equations to determine the asymmetry, and subsequently the best value of K for the remaining heads.

It will, of course, be appreciated that the examples are not intended to limit the scope of protection and that many modifications can be made. For example, the choice of 8 elements for the data transfer head assembly can be varied, with more or less elements being used. The look-up table or equations will then be altered accordingly.

The invention claimed is:

1. Apparatus for use in transferring information from a storage medium comprising:
a data transfer head having at least two information transfer elements, each for producing, by accessing the medium, a respective information transfer signal having a distortion characteristic dependent on a property of said storage medium;
a processor for:
receiving the transfer signals produced from the at least two transfer elements,
determining an appropriate compensation value to apply to said transfer signal for one of said transfer elements so as to at least partially compensate for effects on said signal caused by said distortion characteristic,
accessing stored compensation information which relates to said distortion characteristics of said information transfer elements over a range of storage medium for which said property is different,
referencing said accessed compensation information using said determined compensation value for said one transfer element to establish an appropriate compensation value for said other information transfer element, and
applying said appropriate compensation values to the transfer signals outputted by said transfer elements so as to at least partially compensate for effects on said transfer signals caused by the respective distortion characteristics.

2. Apparatus according to claim 1 wherein the processor is arranged to determine said compensation information for said at least two information transfer elements by monitoring said transfer signal for each said information transfer element when transferring information from a range of magnetic storage medium having different coercivities.

3. Apparatus according to claim 1 wherein said compensation information comprises a set of asymmetry values for each of said information transfer elements.

4. Apparatus according to claim 1 wherein said compensation information comprises a respective set of compensation values for each said information transfer element with each compensation value being dependent on a coercivity of said storage medium.

5. Apparatus according to claim 1 wherein said compensation information comprises a set of scaling values, each scaling value indicating how much said distortion of said signal from an information transfer element has changed for a given medium property relative to a reference medium of known property.

6. Apparatus according to claim 1 wherein said compensation information comprises a respective mathematical expression associated with each said information transfer element.

7. Apparatus according to claim 1 which comprises a tape drive wherein said medium comprises a magnetic tape which is removable from said drive.

8. A method for use in transferring information from a storage medium, the method comprising:
receiving information transfer signals from at least two information transfer elements that are responsive to information on different parts of the medium, the at least two information transfer elements being part of a data transfer head;
determining an appropriate compensation value to apply to said information transfer signal for one of said information transfer elements, the compensation value at least partially compensating for distortion in the signal dependent upon a property of said medium;
accessing stored compensation information relating to compensation characteristics of each of the transfer elements over a range of storage medium properties;
referencing said accessed stored compensation information using said compensation value determined for said one element to (i) determine said property of said medium and (ii) subsequently use the determined property of said medium to establish a respective appropriate compensation value for each of the other elements; and
applying the appropriate compensation values to the information transfer signals from the information transfer elements to at least partially compensate for distortion of the respective signals.

9. A method according to claim 8 which further includes the steps of:
determining distortion in a signal from each said information transfer element for a range of magnetic storage medium having different properties, determining, for each element and each medium within said range, a compensation value which reduces said distortion in said signal from each element at each respective property of the medium, and
generating said stored compensation information from said compensation values.

10. A method according to claim 8 wherein said compensation information comprises a set of asymmetry values for each of said transfer elements.

11. A method according to claim 8 wherein said compensation information comprises a respective data set of compensation values for each said information transfer element with each value being dependent upon the coercivity of the storage medium.

12. A method according to claim 8 wherein said compensation information comprises a set of scaling values, each value indicating how much the distortion of said signal from a transfer element has changed for a given medium output condition relative to a reference medium of known output condition.

13. A method according to claim 8 wherein said compensation information comprises a respective mathematical expression associated with each said information transfer element.

14. The method of claim 8 being performed whenever a storage medium has been changed.

15. A tangible computer-readable medium storing a computer program comprising a set of instructions which when running on a processor cause said processor to:
receive an information transfer signal from each of a plurality of information transfer elements that are part of a data transfer head;
determine an appropriate compensation value to apply to said transfer signal for one of said transfer elements which at least partially compensates for distortion in said signal caused by a property of said medium;

access stored compensation information which relates to compensation characteristics of each of said transfer elements over a range of storage medium properties;

reference said accessed stored compensation information with said compensation value determined for said one transfer element to (i) determine said property of said medium and (ii) subsequently use the determined property of said medium to establish a respective appropriate compensation value for each of the other of said transfer elements which at least partially compensates for a distortion in their respective signals.

16. The tangible computer-readable medium of claim 15 comprising an EPROM.

17. A magnetic tape drive comprising:

a data transfer head comprising at least two magneto-resistive information transfer elements, each producing a transfer signal in the presence of a magnetic flux from a magnetic storage medium having an associated coercivity;

a signal processing apparatus for: (a) determining an appropriate compensation value to apply to said transfer signal for one of said transfer elements, the compensation value at least partially compensating for distortion in said signal dependent upon the coercivity of said storage medium, (b) storing compensation information which relates to said distortion characteristics of each of said transfer elements over a range of storage medium coercivities; (c) accessing the stored compensation information; (d) referencing said accessed stored compensation information with said compensation value determined for said one element to (1) determine said coercivity of said medium and (2) subsequently use the determined coercivity of said medium to establish a respective appropriate compensation value for each of the other of said elements, and (e) applying said appropriate compensation values to the signals outputted by said transfer elements so as to at least partially compensate for distortion in said signals caused by the coercivity of said storage medium.

18. Apparatus for use in transferring information from a storage medium having an associated output condition comprising:

a data transfer head having at least a two information transfer elements, each producing, by accessing the medium, a respective information transfer signal having a distortion characteristic dependent upon the output condition of said storage medium;

processing means for receiving the transfer signals produced from the at least two transfer elements, determining an appropriate compensation value to apply to said information transfer signal for one of the information transfer elements which at least partially compensates for distortion in said signal, accessing stored compensation information which relates to compensation characteristics of each of the information transfer elements over a range of storage medium properties, referencing said accessed compensation information with said compensation value determined for said one transfer element to establish a respective appropriate compensation value for each other of said transfer elements, and applying said appropriate compensation values to the transfer signals outputted by said transfer elements so as to at least partially compensate for effects on said transfer signals caused by the respective distortion characteristics.

19. A method of reducing the effects of distortion on signals from a plurality of information transfer elements of a data transfer apparatus comprising:

receiving signals outputted by the plurality of information transfer elements that are part of a data transfer head;

determining a compensation value required to at least partially compensate for a distortion characteristic of the signal outputted from one of said information transfer elements;

determining a respective appropriate compensation value to apply to said other information transfer elements by referencing stored compensation information relating to distortion characteristics of said other information transfer elements by using said determined compensation value for the one information transfer element; and applying said compensation values to the signals outputted from said plurality of information transfer elements so as to at least partially compensate for effects on said signals caused by the respective distortion characteristics.

20. Apparatus for use in transferring information from a storage medium comprising:

a data transfer head having at least two information transfer elements, each for producing, by accessing the medium, a respective information transfer signal having a distortion characteristic;

a memory storing compensation information which together with a value for a distortion characteristic exhibited by one of the information transfer elements enables an estimate of the distortion characteristic of said other head elements to be made; and a processor for:

receiving the information transfer signals outputted by the information transfer elements;

determining the value for the distortion characteristic exhibited by one of the information transfer elements, accessing the stored compensation information, referencing said accessed information using said determined value for the distortion characteristic exhibited by one of the information transfer elements to establish an estimate of the distortion characteristics of said other head elements, and based on the determined and estimated distortion characteristics of said head elements, applying appropriate compensation values to the transfer signals outputted by said transfer elements so as to at least partially compensate for effects on said signals caused by the respective distortion characteristics.

* * * * *